United States Patent
Blanchard et al.

(10) Patent No.: US 9,802,338 B2
(45) Date of Patent: Oct. 31, 2017

(54) METHOD FOR MOLDING TAILORED COMPOSITES

(71) Applicant: Ford Global Technologies, LLC, Dearborn, MI (US)

(72) Inventors: Patrick James Blanchard, Ann Arbor, MI (US); Jeffrey Scott Dahl, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 509 days.

(21) Appl. No.: 14/055,493

(22) Filed: Oct. 16, 2013

(65) Prior Publication Data

US 2015/0104633 A1     Apr. 16, 2015

(51) Int. Cl.
| | |
|---|---|
| *B29C 31/00* | (2006.01) |
| *B29C 43/02* | (2006.01) |
| *B29C 43/20* | (2006.01) |
| *B29C 47/00* | (2006.01) |
| *B29C 31/04* | (2006.01) |
| *B29C 47/04* | (2006.01) |
| *B29C 47/10* | (2006.01) |
| *B29C 47/92* | (2006.01) |

(Continued)

(52) U.S. Cl.
CPC .......... *B29C 31/004* (2013.01); *B29C 31/045* (2013.01); *B29C 43/02* (2013.01); *B29C 43/20* (2013.01); *B29C 47/004* (2013.01); *B29C 47/04* (2013.01); *B29C 47/1009* (2013.01); *B29C 47/1045* (2013.01); *B29C 47/1081* (2013.01); *B29C 47/92* (2013.01); *B29C 35/02* (2013.01); *B29C 2947/92723* (2013.01); *B29C 2947/92828* (2013.01); *B29K 2101/00* (2013.01); *B29K 2307/04* (2013.01); *B29K 2309/00* (2013.01); *B29L 2009/00* (2013.01); *Y10T 428/24994* (2015.04)

(58) Field of Classification Search
None
See application file for complete search history.

(56) References Cited

U.S. PATENT DOCUMENTS

| | | |
|---|---|---|
| 4,008,829 A | 2/1977 | Chandra et al. |
| 4,850,703 A | 7/1989 | Hanaoka et al. |

(Continued)

OTHER PUBLICATIONS

Plasticomp, Inc., "Compression Molding Services", Copyright 2012 PlastiComp, Inc., 2 pages.

*Primary Examiner* — Edmund Lee
(74) *Attorney, Agent, or Firm* — Damian Porcari; Brooks Kushman P.C.

(57) ABSTRACT

In at least one embodiment, a molding method for producing a molded article is provided. The method may include introducing polymer and fiber separately into an extruder in a first ratio to produce a first extruded material having a first fiber content and in a second ratio to produce a second extruded material having a second fiber content different from the first fiber content. The method may further include filling a first region of a mold with the first extruded material and a second region of the mold with the second extruded material. The extruded material may be formed as blanks for use in compression molding or may be introduced into an injection chamber for use in injection molding. The method may be used to form molded articles having a plurality of regions having different fiber contents.

10 Claims, 3 Drawing Sheets

(51) Int. Cl.
  *B29K 101/00* (2006.01)
  *B29K 307/04* (2006.01)
  *B29K 309/00* (2006.01)
  *B29L 9/00* (2006.01)
  *B29C 35/02* (2006.01)

(56) References Cited

U.S. PATENT DOCUMENTS

| | | | |
|---|---|---|---|
| 4,917,747 A * | 4/1990 | Chin | B29C 53/04 156/198 |
| 5,401,154 A * | 3/1995 | Sargent | B29B 11/10 264/108 |
| 5,772,319 A | 6/1998 | Pemberton et al. | |
| 6,558,146 B1 * | 5/2003 | Shah | B29C 31/044 425/113 |
| 7,691,305 B2 * | 4/2010 | Sutton | B29C 45/0005 264/148 |
| 2002/0149133 A1 * | 10/2002 | Visconti | B29C 31/045 264/248 |
| 2003/0038402 A1 * | 2/2003 | Visconti | B29C 31/044 264/257 |
| 2003/0047825 A1 * | 3/2003 | Visconti | B29C 31/044 264/40.1 |
| 2006/0264556 A1 | 11/2006 | Lustiger et al. | |
| 2008/0063869 A1 * | 3/2008 | Mortazavi | B29C 43/203 428/411.1 |
| 2008/0081876 A1 | 4/2008 | Lustiger et al. | |
| 2011/0002190 A1 | 1/2011 | Tardif | |
| 2011/0215496 A1 | 9/2011 | Ogura et al. | |

* cited by examiner

METHOD FOR MOLDING TAILORED COMPOSITES

TECHNICAL FIELD

One or more embodiments relate to a process for molding components having tailored fiber content.

BACKGROUND

Molded composites including polymer and a reinforcing material (e.g., fibers) offer enhanced strength and stiffness properties and reduced weight compared to traditional structural materials. Thermoplastic injection and compression molded composites are generally produced from pre-compounded pellets, which may include polymer, fiber, and other additives. The pre-compounded pellets are formed from raw materials provided by suppliers which are pelletized by a material converter. When a manufacturer fabricates a part, they acquire the desired pellets having the necessary composition. The pellets are typically fed into an extruder, where they are melted, and the melted composition is transferred to a molding tool (e.g., injection or compression molding tool).

SUMMARY

In at least one embodiment, a molding method is provided. The method may include introducing polymer and fiber separately into an extruder in a first ratio to produce a first extruded material having a first fiber content and in a second ratio to produce a second extruded material having a second fiber content different from the first fiber content. The method may further include filling a first region of a mold with the first extruded material and a second region of the mold with the second extruded material.

In another embodiment, the filling step produces a molded article in which the first and second regions contact each other. In another embodiment, the first extruded material and the second extruded material are formed as blanks, and the blanks may be placed in a compression mold, for example, by a robot. The blanks may be placed in predetermined regions in the compression mold according to the fiber content of the blanks. In another embodiment, the introducing step further includes producing a third extruded material blank having a third fiber content different from the first and second fiber contents and the filling step includes filling a third region of the mold with the third extruded material blank. The first, second, and third extruded materials may be produced in order of increasing or decreasing fiber content. In one embodiment, the introducing step includes introducing a first type of fiber into the first extruded material and a second type of fiber into the second extruded material. In another embodiment, the introducing step includes introducing fiber such that the first and second extruded materials have a fiber content of 10 to 70 wt %.

In another embodiment, the filling step includes injection molding the first extruded material and the second extruded material into the mold. The method may further comprise loading the first extruded material and the second extruded material into an injection chamber in a predetermined order such that during the filling step, the first extruded material fills the first region of the mold and the second extruded material fills the second region of the mold. In one embodiment, the loading of the first and second extruded material into the injection chamber may be done according to flow models. The introducing step may further include producing a third extruded material having a third fiber content different from the first and second fiber contents and the loading step includes loading the third extruded material into the injection chamber such that during the filling step, the third extruded material fills a third region of the mold.

In at least one embodiment, a molded article is provided comprising a single, fiber-reinforced polymer having a first continuous bulk region with a first fiber content and a second continuous bulk region with a second fiber content different from the first fiber content. The first and second fiber contents may be from 10 to 70 wt %. In one embodiment, the first and second regions contact each other. In another embodiment, the molded article further comprises a transition region located between the first and second regions having a fiber content that is intermediate the first and second fiber contents. The molded article may further comprise a third continuous bulk region with a third fiber content that is different from the first and second fiber contents. In another embodiment, the first region and the second region include different fiber types.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Pre-compounded pellets add expense and an extra step in the process of producing molded composites from raw polymer and reinforcing materials, such as fiber. Direct compounding of materials may eliminate the intermediate step of pelletizing, thereby reducing cost and streamlining the process. Direct compounding is a process in which the raw materials, such as polymer, fibers, and additional additives are mixed and extruded at the same location as the subsequent molding without a pelletizing step. The raw materials may be introduced into the extruder in the desired amounts to form a certain final composition, generally characterized by a weight percent of fiber. The melted composition is then transported to a molding tool, for example an injection or compression molding tool, and a composite part is molded.

Direct compounding may reduce the cost and eliminate the step of pelletizing the raw materials; however, both conventional and direct compounding processes include using a material charge with uniform fiber load. The resulting product therefore has a substantially constant fiber load throughout the part. Reduced fiber content compositions generally have improved flow behavior and ease of molding compared to those with higher fiber content. Therefore, during part design and optimization, the stiffness and strength of the component are generally controlled by the thickness of the component. In portions of the component requiring higher stiffness and/or strength, the component is generally made thicker, and vice versa for portions with reduced stiffness and/or strength requirements. In addition to potential weight and cost increases from making certain portions thicker, another disadvantage of this approach is that increased part thickness may lead to longer process cycle times.

Figure 1:
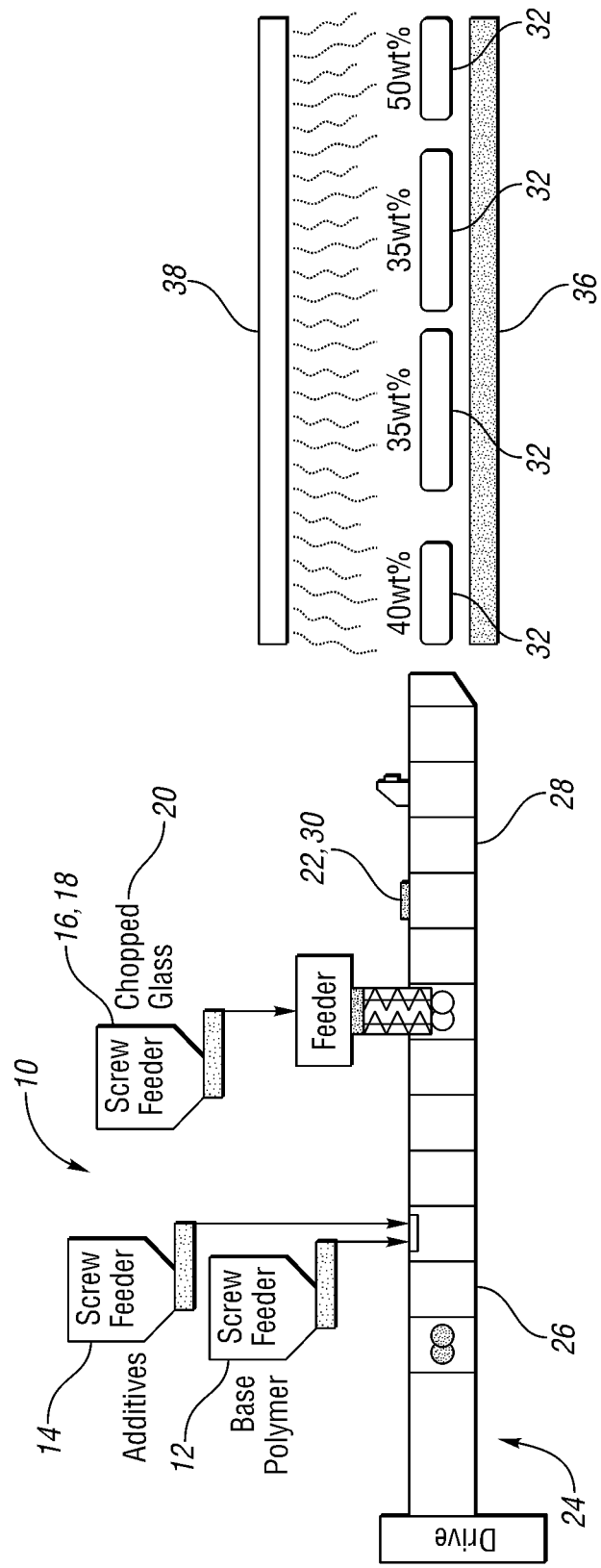
FIG. 1 is a schematic diagram of a direct compounding process used in conjunction with compression molding, according to an embodiment.
Figure 2:
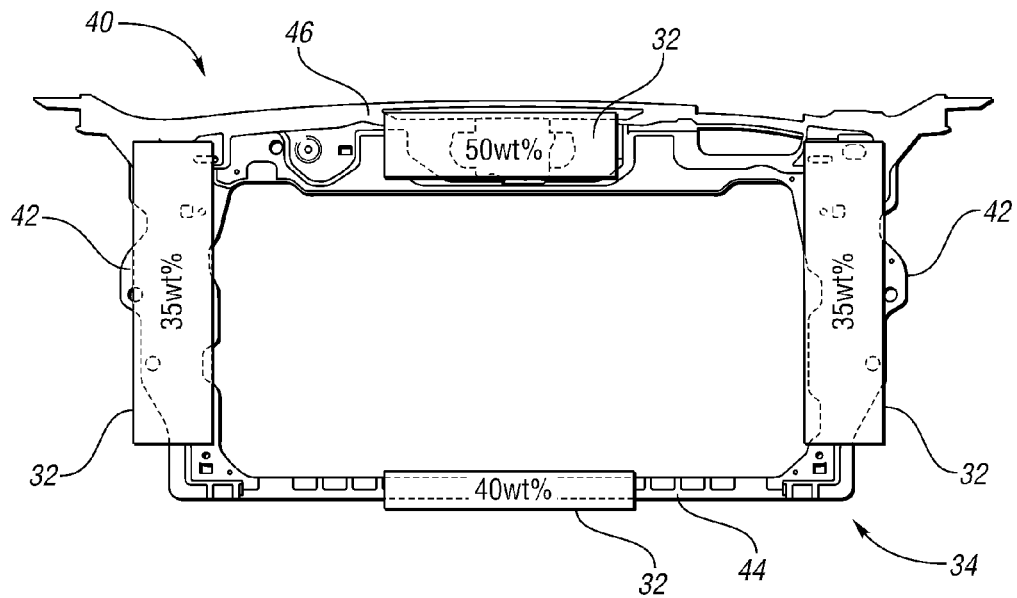
FIG. 2 is a schematic of a compression mold receiving four blanks of extruded material according to their fiber content, according to an embodiment.
Figure 3:
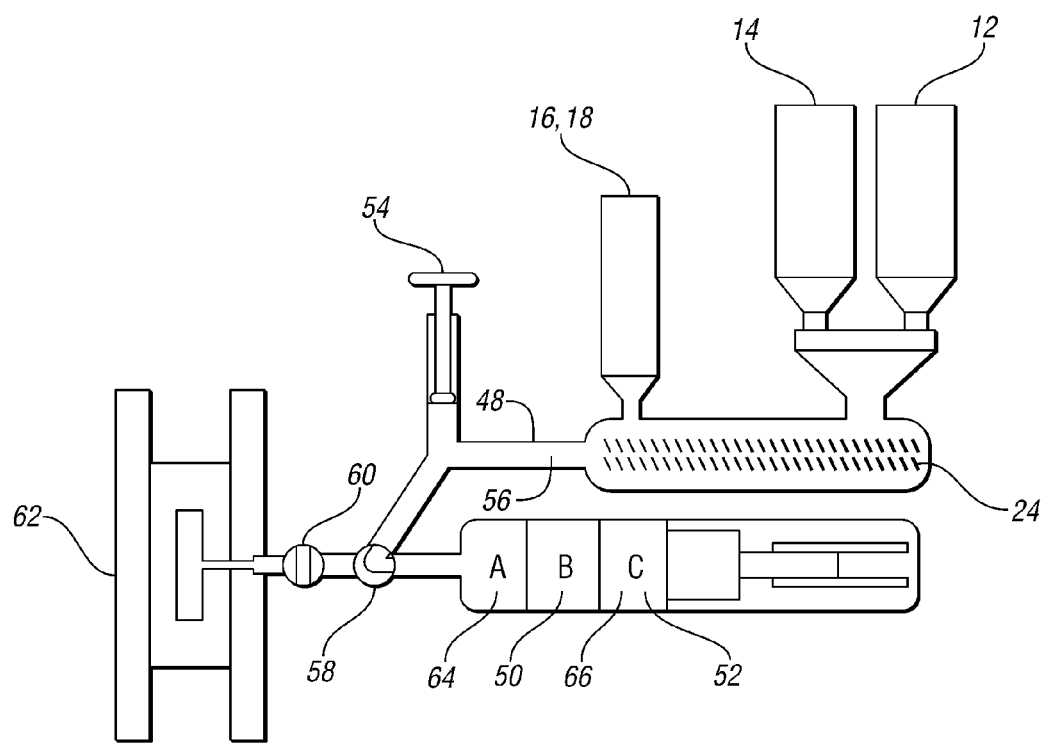
FIG. 3 is a schematic diagram of a direct compounding process used in conjunction with injection molding, according to an embodiment.

With reference to FIGS. 1 to 3, embodiments of a process are shown in which the fiber content of the composite may be tailored in localized portions of a component to enable thinner wall sections and reduced process cycle times. In at least one embodiment, the process is a modified direct compounding process 10. The process may include multiple material feed streams, such as raw polymer 12, additives 14, and/or reinforcing material 16. The reinforcing material may be fibers 18, for example, chopped fibers 20 and/or continuous fibers 22. In one embodiment, the fibers are glass fibers; however any suitable type of fiber may be used, such as carbon fibers, synthetic fibers, or others. The multiple material feed streams may be independently operated such that a feed rate of each component is controlled relative to the other components to give a certain weight percent of each component in the final material.

With reference to FIGS. 1 and 3, examples of direct compounding systems are shown. An extruder 24, which may be a screw extruder having one, two, or more screws, is configured to receive raw material feed streams 12, 12, 16, and/or 18. The raw material feed streams may include one or more polymer streams 12, one or more additive streams 14, and one or more reinforcing material streams 16. In at least one embodiment, the reinforcing material streams include one or more fiber streams 18. The fiber streams may include at least one chopped fiber stream 20 and/or at least one continuous fiber stream 22. The extruder 24, for example, a twin screw extruder or compounder, may be divided into multiple zones or barrels along its length. Each barrel may have its own temperature control such that each barrel may be a different temperature and/or a temperature gradient may be created along the length of the extruder.

The material feed streams may enter the extruder 24 in different barrels along the extruder. In one embodiment, the polymer stream(s) 12 and the additive stream(s) 14 enter the extruder in the first half 26 of the extruder, or the proximal half (e.g., the half opposite where the material exits the extruder). In another embodiment, the reinforcing stream(s) 16 (e.g., fiber streams 18) enter the extruder in the second half 28 of the extruder, or the distal half (e.g., the half adjacent where the material exits). In one embodiment, the polymer stream(s) 12 and the additive stream(s) 14 are introduced to the extruder from a screw feeder. In another embodiment, the reinforcing material 16 may be introduced from a screw feeder. In this embodiment, the reinforcing material 16 may be chopped glass fibers 20. In embodiments where the reinforcing material is a continuous fiber 22, for example, continuous glass fibers, the fibers may be introduced into the extruder from an entry port 30. Continuous fibers 22 may be in the form of rovings and may be provided in the form of rolls or spools.

By controlling the individual feed rates of each component and/or stream, a predetermined material composition can be formed. Certain parts to be manufactured may have regions or portions have higher or lower strength or stiffness requirements. By controlling the feed rates of each component, a compounding profile can be created for the part such that the reinforcing material content is higher in the regions requiring higher strength/stiffness and lower in the regions requiring lower strength/stiffness. By controlling the reinforcing material (e.g., fiber) content within the part, areas with higher required strength/stiffness can be formed with higher fiber content and reduced thickness. This differs from the conventional process of using uniform fiber content throughout a part and increasing part thickness in regions with higher strength/stiffness requirements. Parts having tailored fiber content can therefore be made thinner, which may reduce weight, cost, and/or cycle time. In addition, areas having lower strength or stiffness requirements can be made with a reduced fiber content, which improves the flow properties and reduces material.

With reference to FIGS. 1 and 2, in at least one embodiment, the modified direct compounding process 10 is used in conjunction with compression molding to form parts having tailored reinforcing material content. Direct compounding of polymer 12, reinforcing material 16 (e.g., fiber) and, in some embodiments, additives 14 may be performed in accordance with the process described above to form extruded strips or blanks 32 of charge material with varying fiber content. The blanks 32 may then be placed in a compression molding tool 34 according to their fiber content, such that regions of the mold tool that correspond to areas of the produced part requiring high strength/stiffness are provided with blanks 32 having relatively high fiber content and regions corresponding to areas having lower strength/stiffness requirements are provided with blanks 32 having relatively low fiber content.

In at least one embodiment, the molding process includes producing two or more extruded blanks 32 having different fiber contents and placing the blanks in a compression mold 34. The blanks 32 may have any suitable size or shape, according to the mold being used. The blanks 32 may be, for example, rectangular, circular, or oval in cross-section. The blanks 32 may be moved from the extruder 24 to the compression mold apparatus 34 by a conveyor belt 36. The conveyor belt 36 may be heated to keep the blanks at a temperature suitable for molding. In place of or in addition to heating the conveyor belt 36, ovens or other heating sources 38 may be located along the conveyor belt 36 to keep the blanks 32 at an appropriate temperature. The blanks 32 may be placed into the compression mold 34 manually or by a robot (not shown).

In at least one embodiment, depending on the order in which the blanks 32 are produced and/or arrive at the compression mold 34, a robot may be programmed to place the blanks 32 in the mold in a predetermined order or to place certain blanks 32 in predetermined locations, such that the blanks 32 with the desired fiber content are placed in the desired portion of the mold 34. For example, if a mold will use four blanks and the blanks arrive in order from lowest to highest fiber content, the robot may be programmed to first select and place the second blank, then the fourth blank, then the first blank, and then the third blank, in order to place the blanks with certain fiber content in their proper location for the produced part. A benefit of using a robot programmed to select blanks in a certain order is that the extruder may be operated so that blanks are produced with increasing or decreasing fiber content. For example, if a part will have three blanks having 40%, 50%, and 35% fiber content, respectively, the extruder may be programmed to produce the 50% blank first, then the 40%, then the 35%, or vice versa. By producing the blanks in order from lowest to highest or highest to lowest fiber content, the change in fiber content may be varied more gradually. Quick steps up or down in fiber content may be difficult to achieve in the extruder and could lead to blanks having higher or lower fiber content than desired.

In some embodiments, however, the blanks 32 may be produced in the extruder 24 such that they arrive at the mold 34 in a predetermined order. For example, if a robot fills a mold 34 in a fixed order and the first location has a desired fiber content of 35%, the second location of 50%, and the third location of 40%, the extruder 24 may be configured or controlled to produce blanks 32 having 35%, 50%, and 40%, in that order, so that the robot may select the blanks 32 as they arrive rather than out of order.

The number of blanks 32 may vary depending on the number of regions in the part that require high or low strength/stiffness. Generally, more complex parts will have an increased number of blanks 32 compared to less complex parts, however any suitable number of blanks 32 may be used. In the example shown in FIG. 2, four blanks 32 are used to form a front end carrier 40 of an automobile. In this example, the side portions 42 require less strength/stiffness than the lower portion 44, which in turn requires less strength/stiffness than the upper portion 46. Accordingly, the side portions 42 are compression molded with a blank 32 having 35 wt % fiber content, the lower portion 44 is molded with a blank 32 having 40 wt % fiber content, and the upper portion 46 is molded with a blank 32 having 50 wt % fiber content. These weight percentages are exemplary, however, and any suitable fiber content may be used in accordance with the described process. In addition, while the process shown in FIG. 2 has four blanks 32, any suitable number of blanks 32 may be used to form the desired fiber content profile in the produced part. For example, there may be 2, 3, 4, 5, or more blanks 32 used to compression mold a part.

The blanks 32 may have any suitable fiber content. In at least one embodiment, the fiber content of the blanks is at least 10 wt %. In another embodiment, the fiber content is no greater than 70 wt %. Fiber content below 10 wt % may be used, but the increase in mechanical properties may not be adequate for some applications. Similarly, fiber content above 70 wt % may be used, but the flow properties may become too poor for some applications. In one embodiment, the fiber content of the blanks is from 10 to 70 wt %. In another embodiment, the fiber content of the blanks is from 15 to 60 wt %. In another embodiment, the fiber content of the blanks is from 20 to 55 wt %. In another embodiment, the fiber content of the blanks is from 25 to 50 wt %.

In some embodiments, multiple reinforcing materials may be used, for example two or more types of fiber 18 (e.g., "hybrid" blanks) "Type of fiber" may include different materials, different length, different processing, or any other difference in properties. In at least one embodiment, fibers having at least two different materials are included in one, some, or all of the blanks. Any of the fiber materials discussed above may be include, for example, the blanks may include glass and carbon fibers, glass and synthetic fibers, carbon and synthetic fibers, two different synthetic fibers, etc. In addition, fibers having at least two different lengths may be included in one, some, or all of the blanks (e.g., chopped and continuous). In some embodiments, more than two different materials may be used. In another embodiment, one or more blanks may include one fiber type and one or more blanks may include a different fiber type. For example, one or more blanks may include glass fiber and one or more blanks may include carbon fiber. The same may apply for fibers of different lengths (e.g. some blanks have chopped and some have continuous). In some embodiments, there may be more than two different types of blanks. Including multiple fiber types in the same or in different blanks may allow further tailoring of properties (e.g. strength and/or stiffness) within a molded part. It may also allow for the cost of a component to be managed while still achieving improved properties.

With reference to FIG. 3, in at least one embodiment, the modified direct compounding process is used in conjunction with injection molding to form parts having tailored reinforcing material content. Direct compounding of polymer, reinforcing material (e.g., fiber) and, in some embodiments, additives may be performed in conjunction with the process described above to form extruded material 48 having a tailored fiber content. The extruded material 48 may then be used as a shot of material 50 in an injection molding chamber 52. The direct compounding system and process may be similar to that which was described previously and include raw material feed streams including one or more polymer streams 12, one or more additive streams 14, and one or more reinforcing material streams 16. The system may further include additional equipment for injection molding, for example, a melt buffer 54, start-up valve 56, re-direction valve 58, shut-off nozzle 60, and clamp(s) 62. The fiber type and content and the processing of the extruded material 48 may be the same as any of the embodiments described above regarding compression molding.

By controlling the individual feed rates of each component, the shot material 50 can have varying fiber content throughout. The fiber content may be tailored within the shot material 50 such that upon injection, the portions of the shot material 50 with relatively high fiber content are delivered to regions of the molded composite that require high strength/stiffness and the portions of the shot material 50 with relatively low fiber content are delivered to regions of the composite with lower strength/stiffness requirements. The portions of the shot material 50 that are delivered to the desired regions of the mold may be controlled by any combination of the sprues and runners of the injection molding system, the injection sequencing, and the injections drops. For example, if regions of the mold that will be filled first require high strength/stiffness, then the portion of the shot material 50 located in the front or distal end 64 of the injection chamber may have a higher fiber content and the portion located in the back or proximal end 66 of the injection chamber may have a lower fiber content. As shown in FIG. 3, the shot material in the injection chamber may be separated into portions having different fiber content. In the embodiment shown, there are three portions: A, B, and C. These portions may correspond to the shot material that will fill predetermined regions 68 in the mold to give the molded article the desired fiber content profile. The number and composition of the shot material portions may vary within the injection chamber depending on the number and location of the high strength/stiffness regions 68 desired in the final molded composite part.

The shot material fiber profile within the injection chamber may be determined using flow models of the injection molding process for a given mold or product. Commercially available software may be used to determine which portion of the shot material will fill each region of the mold during the injection process. Once the distribution of the shot material within the mold is known, a fiber content profile can be designed. The fiber profile may be configured such that portions of the shot that will fill mold regions corresponding to regions of the part having high strength or stiffness requirements can be produced with higher fiber content. Similarly, portions that will fill mold regions corresponding to regions of the part having lower strength or stiffness requirements can be produced with lower fiber content. Using the flow models, the sprues and runners, the injection sequencing, and/or the injections drops can be configured to deliver the portions of the shot material having the desired fiber content to the appropriate region of the mold.

Molded articles produced in accordance with any embodiment of the molding process described above may include two, three, four, or more regions 68 of varying fiber content. The regions 68 may be substantially continuous bulk regions. The bulk regions may form a substantial part of the molded article and may have a predetermined size and shape, as described previously. This is in contrast to a molded article intended to have uniform fiber content throughout that has minor fluctuations or localized spikes or valleys in fiber content due to imperfections in the molding process. For example, a molded article may include three regions, each having different fiber content from each other, such as 35 wt %, 40 wt %, and 50 wt %. Since the articles are produced from a single molding process, the regions may contact each other. In at least one embodiment, the regions are separated by transition regions 70 having a fiber content that is intermediate the two adjacent regions. Intermediate regions 70 may be formed in injection molding due to the less strict segregation of extruded material in the injection chamber. However, intermediate regions 70 may also be formed with other molding processes, such as compression molding, in portions of the mold where two regions meet.

Figure 4:
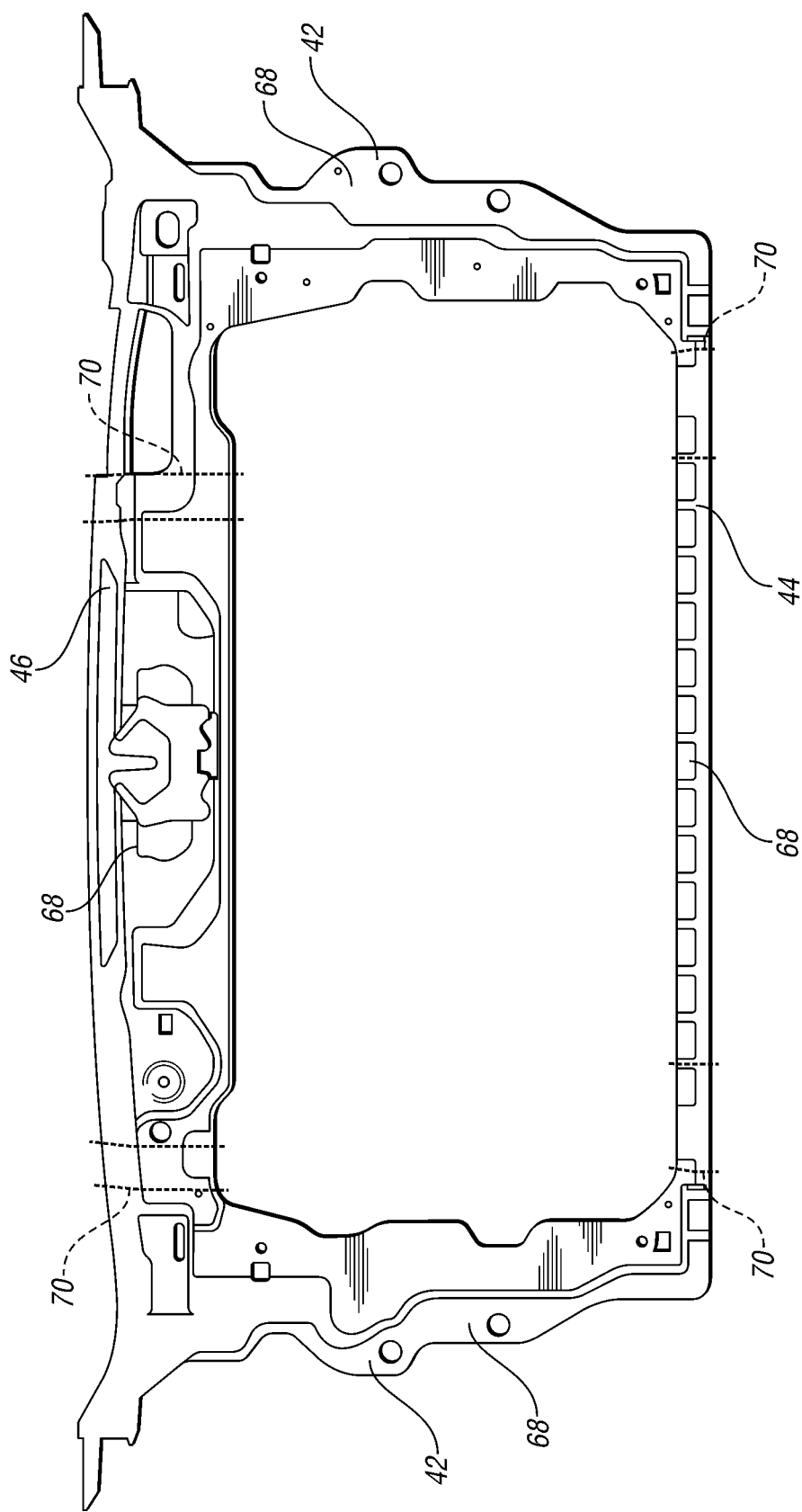
FIG. 4 is a schematic of a molded article having regions of different fiber content and transition regions therebetween having intermediate fiber content.

An example of a molded article having different regions 68 and transition regions 70 is shown in FIG. 4. FIG. 4 illustrates a schematic front end carrier 40 produced from the molding process in FIG. 2, having side regions 42 with 35 wt % fiber, an upper region 46 with 50 wt % fiber, and a lower region 44 with 40 wt % fiber. Depending on the type of molding and the processing conditions, transition regions 70 may be present between each region 68. For example, between the side regions 42 and the upper region 46, there may be a transition region 70 having an intermediate fiber content. The intermediate fiber content may be approximately the average of the two adjacent regions, such as 42.5 wt % between the side regions and the top region or 37.5 wt % between the side regions 42 and the lower region 44 in FIG. 4. The transition regions 70 may also have a gradient of fiber content from the lower fiber content adjacent region to the higher fiber content adjacent region.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A molding method comprising:
    introducing polymer and fiber separately into an extruder in a first ratio to produce a first extruded blank having a uniform first fiber content and in a second ratio to produce a second extruded blank, separate from the first extruded blank, having a uniform second fiber content different from the first fiber content;
    filling a first region of a compression mold with the first extruded blank and a second region of the mold, laterally spaced from the first region, with the second extruded blank; and
    compression molding the first and second extruded blanks at the same time to form a molded article in which material in the first and second extruded blanks contact each other.

2. The method of claim 1, wherein the filling step includes robotically placing the blanks in the compression mold.

3. The method of claim 1, wherein the filling step includes placing the blanks in predetermined regions in the compression mold according to the fiber content of the blanks.

4. The method of claim 1, wherein the introducing step further includes producing a third extruded blank having a uniform third fiber content different from the first and second fiber contents and the filling step includes filling a third region of the mold, laterally spaced from the first and second regions, with the third extruded blank to form a transition region between the first and second regions, wherein the third fiber content is lower than the first fiber content and higher than the second fiber content.

5. The method of claim 4, wherein the first, second, and third extruded blanks are produced in order of increasing or decreasing fiber content.

6. The method of claim 1, wherein the introducing step includes introducing a first type of fiber into the first extruded blank and a second type of fiber into the second extruded blank.

7. The method of claim 1, wherein the introducing step includes introducing fiber such that the first and second extruded blanks have a fiber content of 10 to 70 wt %.

8. A molding method comprising:
    extruding a first composite blank having a first fiber content and a second composite blank separate from the first composite blank and having a second fiber content different from the first fiber content;
    inserting the first and second composite blanks into first and second laterally spaced regions, respectively, of a compression mold; and
    compression molding the first and second extruded blanks at the same time.

9. The method of claim 8, further comprising transporting the extruded first and second composite blanks to the compression mold on a heated conveyor belt, the heated conveyor belt configured to maintain the extruded blanks above a predetermined temperature.

10. The method of claim 8, wherein:
    the extruding step includes extruding a third composite blank having a third fiber content and a fourth composite blank having a fourth fiber content, the first, second, third, and fourth fiber contents each being uniform in the respective blanks and each of the first, second, third, and fourth composite blanks being distinct;
    the inserting step includes inserting the first, second, third, and fourth composite blanks into separate first, second, third, and fourth laterally spaced regions of the compression mold, respectively; and
    the compression molding step includes compression molding the first, second, third, and fourth composite blanks at the same time to form a molded article in which material in each of the first, second, third, and fourth composite blanks contacts at least one of the other composite blanks.

* * * * *